Feb. 23, 1965  H. D. LANGE  3,170,739
BEARING ASSEMBLY
Filed July 22, 1963
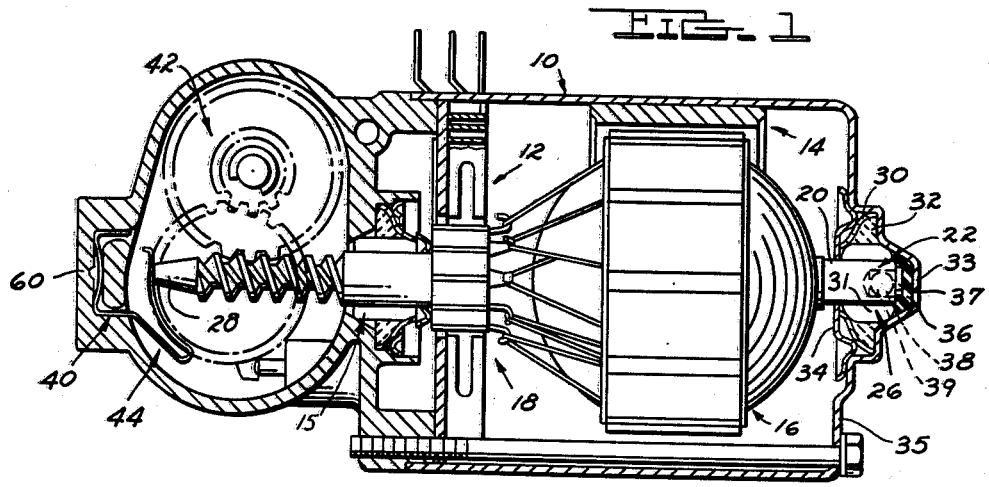
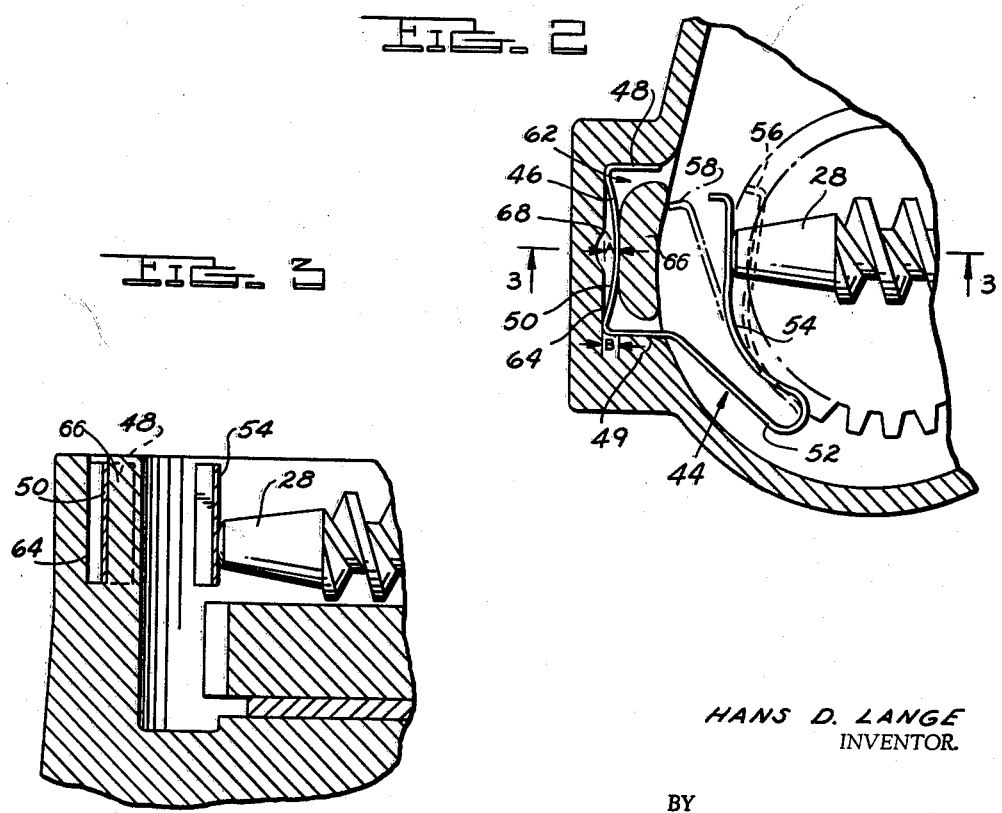
HANS D. LANGE
INVENTOR.
BY
John R. Faulkner
Stuart Lubitz
ATTORNEYS United States Patent Office 3,170,739
Patented Feb. 23, 1965

3,170,739
BEARING ASSEMBLY
Hans D. Lange, Chelsea, Mich., assignor to Ford Motor Company, Dearborn, Mich., a corporation of Delaware
Filed July 22, 1963, Ser. No. 296,674
4 Claims. (Cl. 308—135)

This invention relates to a bearing assembly. More particularly, this invention relates to a leaf spring bearing assembly for a dynamoelectric machine such as a windshield wiper motor.

It has been the common practice to use a bearing assembly at one end of a motor comprising a set screw, and a bearing surface. In some instances a coil spring is included in the bearing assembly. A bearing assembly including a coil spring is shown in U.S. Patent 2,357,-152 issued on August 29, 1944 to J. B. Whitted. In this type of arrangement after a period of use the shaft and/of the bearing surface wears considerably. The coil spring expands under these conditions and does not exert sufficient pressure to prevent the end of the armature shaft from moving away from the bearing surface when a force caused by the reversal of the windshield wiper direction is transmitted to the armature shaft. This movement away from the bearing surface and its subsequent return results in a knocking sound and consequently noise is transmitted to the vehicle compartment. In addition, this type of assembly involves a number of parts and is subject to rather narrow tolerance requirements.

The invention described herein minimizes any undesirable noise, is considerably simpler than prior art constructions and is subject to relatively liberal tolerance requirments. The invention comprises a uniquely shaped leaf spring and a means for capturing the spring so that it is fixed in the motor housing. The details and specific advantages of the invention will be readily understood when the specification is considered in detail.

The general object of the invention is the provision of an improved bearing assembly.

Another object of this invention is the provision of an improved bearing assembly for a windshield wiper motor.

Another object of the invention is the provision of a bearing assembly which substantially minimizes any bearing noise.

Another object of the invention is the provision of a bearing assembly which is easy to assemble.

Another object of the invention is the provision of a bearing assembly which utilizes a minimum of parts.

Another object of the invention is the provision of a bearing assembly in which the component parts are not subject to narrow, critical tolerances.

These and other objects and advantages will become apparent when the detailed description is read in conjunction with the drawings wherein:

FIGURE 1 is a sectioned elevation of a dynamoelectric machine such as a windshield wiper motor embodying the improved bearing assembly;

FIGURE 2 is an enlarged sectional plan view of the invented bearing assembly; and FIGURE 3 is a sectional view taken along the lines 3—3.

Referring to FIGURE 1, a dynamoelectric machine or motor 10 is shown having the usual and well-known construction of a brush assembly 12, a field structure 14, an armature 16 and a commutator 18. The particulars of this motor construction do not form part of the instant invention and any motor or generator structure may be utilized consistent with the concept of this invention. Typical motor and generator constructions are shown in such patents as U.S. Patent 3,013,167 issued to H. A. Bobula on December 12, 1961 and U.S. Patent 3,087,081 issued to T. G. Apostoleris on April 23, 1963.

The armature 16 is supported by a driving shaft 20 which has a first end 22 supported in the bearing means 26 and a second end 28 supported by the bearing assembly 40 and a radial bearing means 15. The bearing means 26 for supporting the first end of the shaft 22 is a conventional construction comprising an annular spring 30 which engages a bearing sleeve 31 and a packing 32. The annular spring 30 is held in position by a spring retainer 34 that is fixed to one end of the housing 35 by a suitable fastening means such as a rivet or spot weld. Any axial thrust directed towards the right and transmitted to the shaft 20 may be absorbed by an elastomer 36 imbedded in a cup portion 33 of the housing. The elastomer 36 has a steel disc 37 imbedded therein which abuts a ball bearing 38 received by an aperture 39 in the first end of the shaft 22. The ball bearing 38 is in rolling contact with the disc 37. It is desirable that this ball bearing be maintained in continuous contact with the disc. Any departure of the ball bearing 38 from the surface of the disc 37 will result in a knocking and consequenting noise when the ball bearing is returned to contact with the disc 37. The radial bearing means 15 is similar in construction to the bearing means 26 except that it does not have any means for taking the end thrust of the driving shaft 20. With this in mind, the bearing assembly 40 is constructed so that the axial force exerted by it on the second end of the shaft 28 will always be greater than any opposing axial force to the left. This axial force is transmitted to the shaft 20 by the driving of the driven means 42 and by the periodic reversal of the attached wiper blades or any other device that may be attached to the driven means.

The bearing assembly 40 (FIGURES 2 and 3) comprises a resilient means or spring 44 having a first portion 46 that takes the form of a channel-shaped member having two legs 48 and 49 that are connected by a curved portion or surface 50. A second resilient portion 52 of the spring 44 is continuous with the first portion 46 and takes the form of a reverse bend leaf spring. The second resilient portion 52 has an end 54 that is coupled to or that is directly in contact with the shaft end 28. The resilient portion 52, proportioned as shown in FIGURE 2, exerts an axial force on the shaft end 28 that is greater than the axial forces (to the left in FIGURE 2) that are transmitted to the shaft 20 by the driven means 42. This axial force will exist regardless of whether the end 54 of the resilient portion 52, when assembled, is in the position shown by the broken lines 56 or in the position shown by the broken lines 58. When the assembly tolerances result in the end 54 taking the position shown by the broken lines 56, the spring 44 will still exert a force greater than the maximum axial forces transmitted to the shaft 20. This enables the spring 44 to move or expand as the shaft end 28 wears with no deterioration of operation and with no increased noise being caused by the bearing assembly. It should be apparent that the ability of the bearing assembly to function properly reagrdless of whether the assembled position 56 or 58 is assumed enables relatively liberal tolerances to be used.

The spring 44 may be made of steel or other material that would wear well when in continuous rotating contact with the shaft end 28. It is within the scope of the invention to attach lubricating materials or other bearing materials, such as Teflon, to the spring end 54 to obtain other desirable characteristics.

The spring 44 is held in the housing 60 by a means for fixing the spring 62. This means 62 comprises a recess 64 that takes the form of a channel with an abutment or integrally cast member 66 located therein. The abutment 66 is placed away from the walls of the channel so that the dimension A is smaller than the dimension B.

The dimension A designates the magnitude of the space 68 which separates the abutment 66 and the channel walls. The dimension B designates the height of the curved portion 50 of the spring. This proportioning of the spring 44 and the means 62 enables the spring 44 to be fixed in position by positioning its curved portion 50 into the space 68. The resulting compression of the curved portion 50 causes the legs 48 and 49 of the spring 44 to abut or closely conform to the channel walls and also causes the spring 44 to be held in position by the compressive or press fit. When the spring 44 is so assembled, the end portion 54 of the spring 44 will project into the housing to contact the shaft end 28 and form an improved bearing assembly.

In operation the large axial force of the spring 44 prevents any substantial axial movement of the shaft 20 and will readily compensate for any wear on the shaft end 28. The improved bearing assembly has the further advantages of being economical and simple. It reduces bearing noise, and facilitates the use of broad assembly tolerances.

It will be understood that the invention is not to be limited to the exact construction shown and described but that various changes and modifications may be made without departing from the spirit and scope of the invention, as defined in the appended claims.

I claim:

1. A dynamoelectric machine comprising a driving shaft, a spring having a first channel-shaped portion including a curved face connected by two legs, and a second resilient portion continuous with said first portion, said second resilient portion constructed to form a reverse bend leaf spring, a housing having a channel-shaped recess therein, said recess having a plurality of walls, an abutment located in said recess and spaced from said walls of said recess, said first channel-shaped portion of said spring positioned in said recess with said two legs engaging said walls of said recess and with said abutment compressing said curved face of said first channel-shaped portion, and said resilient portion of said spring projecting into said housing and engaging one end of the driving shaft of said motor for urging said driving shaft in an axial direction.

2. In a dynamoelectric machine, the combination comprising, a housing, an armature shaft supported in said housing, a bearing means for supporting said armature shaft at one end, said bearing means being substantially rigid in construction, a bearing assembly positioned adjacent the second end of said armature shaft, said bearing assembly comprising a spring having a first portion, holding means in said housing including a channel having walls and an abutment located therein spaced from said walls of said channel, said first portion of said spring including a curved surface and two legs, said curved surface positioned in said channel and compressed by said abutment, said two legs of said first portion engaging said walls, said spring having a resilient portion extending into the interior of said housing and engaging the end of said armature shaft positioned adjacent said bearing assembly.

3. The structure defined by claim 2 wherein said resilient portion of said spring is continuous with one of the legs of said spring and has the shape of a reverse bend leaf spring.

4. A dynamoelectric machine comprising, a driving shaft, a leaf spring having a channel shaped portion and a reverse bend cantilevered resilient portion, a housing having a complementary channel shaped recess receiving said channel shaped portion, said housing and said channel shaped portion including cooperating means for securing said channel shaped portion in said complementary channel shaped recess, said reverse bend cantilevered resilient portion of said spring extending into said housing and engaging one end of said driving shaft for resisting axial movement of said driving shaft.

References Cited by the Examiner

UNITED STATES PATENTS

| 1,835,154 | 12/31 | Hufferd | 287—90 |
| 1,891,804 | 12/32 | Flumerfelt | 287—90 |
| 1,987,178 | 1/35 | Brown | 308—163 |
| 2,648,558 | 8/53 | Flumerfelt | 287—90 |

FOREIGN PATENTS

| 41,671 | 12/32 | France. |
| | | (1st addition to No. 733,351) |

FRANK SUSKO, *Primary Examiner.*